(12) United States Patent
Ohyama et al.

(10) Patent No.: US 7,265,795 B2
(45) Date of Patent: Sep. 4, 2007

(54) VIDEO SIGNAL PROCESSING CIRCUIT, VIDEO DISPLAY APPARATUS, AND VIDEO DISPLAY METHOD

(75) Inventors: Toshiaki Ohyama, Yokohama (JP); Hiroshi Aoki, Yokohama (JP); Ryo Hasegawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/752,170

(22) Filed: Jan. 5, 2004

(65) Prior Publication Data

US 2004/0246537 A1 Dec. 9, 2004

(30) Foreign Application Priority Data

Apr. 18, 2003 (JP) ............................. 2003-114527

(51) Int. Cl.
| | |
|---|---|
| *H04N 5/14* | (2006.01) |
| *H04N 5/52* | (2006.01) |
| *H04N 5/57* | (2006.01) |
| *H04N 5/202* | (2006.01) |
| *G09G 5/02* | (2006.01) |
| *G06K 9/40* | (2006.01) |

(52) U.S. Cl. .................. 348/675; 348/671; 348/674; 348/678; 348/687; 345/589; 382/274

(58) Field of Classification Search ........ 348/254–256, 348/671, 674–675, 678, 687; 345/89, 589, 345/600, 690; 382/274; 358/479

See application file for complete search history.

(56) References Cited

U.S. PATENT DOCUMENTS

| 4,489,349 A | * | 12/1984 | Okada ..................... 348/674 |
| 4,799,106 A | | 1/1989 | Moore et al. |
| 4,829,381 A | * | 5/1989 | Song et al. ............... 348/674 |
| 5,089,890 A | * | 2/1992 | Takayama ................. 348/674 |
| 6,215,529 B1 | * | 4/2001 | Sugimoto et al. .......... 348/675 |

(Continued)

FOREIGN PATENT DOCUMENTS

EP 0459366 A2 12/1991

(Continued)

OTHER PUBLICATIONS

State Intellectual Property Office of China (SIPO) office action dated Jan. 6, 2006 for SIPO patent application CN2004-10034603.

*Primary Examiner*—Brian P. Yenke
(74) *Attorney, Agent, or Firm*—Townsend and Townsend and Crew LLP

(57) ABSTRACT

Embodiments of the invention provide a video display technique with which a stable video with a high contrast can be obtained according to brightness of a screen. In one embodiment, a video signal processing system for a video display apparatus which performs display on the basis of a video signal comprises a gain control module configured to provide a feedback signal based upon maximum luminance level information and average luminance level information of a luminance signal corresponding to the video signal, the feedback signal being used to control a gain of the luminance signal; and a correction module configured to apply a gamma correction based upon the average luminance level information to the video signal after the gain of the luminance signal has been controlled by the gain control module.

7 Claims, 7 Drawing Sheets

U.S. PATENT DOCUMENTS

| | | | |
|---|---|---|---|
| 6,271,891 B1 * | 8/2001 | Ogawa et al. | 348/674 |
| 6,317,157 B1 * | 11/2001 | Takayama | 348/441 |
| 6,344,857 B1 * | 2/2002 | Matono et al. | 345/600 |
| 6,633,343 B2 * | 10/2003 | Ito et al. | 348/674 |
| 6,654,028 B1 * | 11/2003 | Yamakawa | 345/690 |
| 6,677,992 B1 * | 1/2004 | Matsumoto et al. | 348/229.1 |
| 6,795,053 B1 * | 9/2004 | Funamoto et al. | 345/102 |
| 6,850,214 B2 * | 2/2005 | Nishitani et al. | 345/87 |
| 7,027,016 B2 * | 4/2006 | Sakashita | 345/84 |
| 7,034,895 B2 * | 4/2006 | Okunuki et al. | 348/673 |
| 7,034,896 B2 * | 4/2006 | Ito et al. | 348/675 |
| 2003/0156225 A1 | 8/2003 | Ito et al. | |
| 2004/0042676 A1 * | 3/2004 | Srinivasa | 382/254 |
| 2005/0226526 A1 * | 10/2005 | Mitsunaga | 382/274 |

FOREIGN PATENT DOCUMENTS

| | | |
|---|---|---|
| EP | 1111578 A1 | 6/2001 |
| JP | 06-169437 | 6/1994 |
| JP | 08-317250 | 11/1996 |
| JP | 08-317250 A | 11/1996 |
| JP | 2000-172218 | 6/2000 |
| JP | 2001-134235 | 5/2001 |
| JP | 2002-041007 | 2/2002 |
| KR | 2000-0033617 A | 6/2000 |
| WO | WO02/102059 A1 | 12/2002 |

\* cited by examiner

FIG.3
(a)
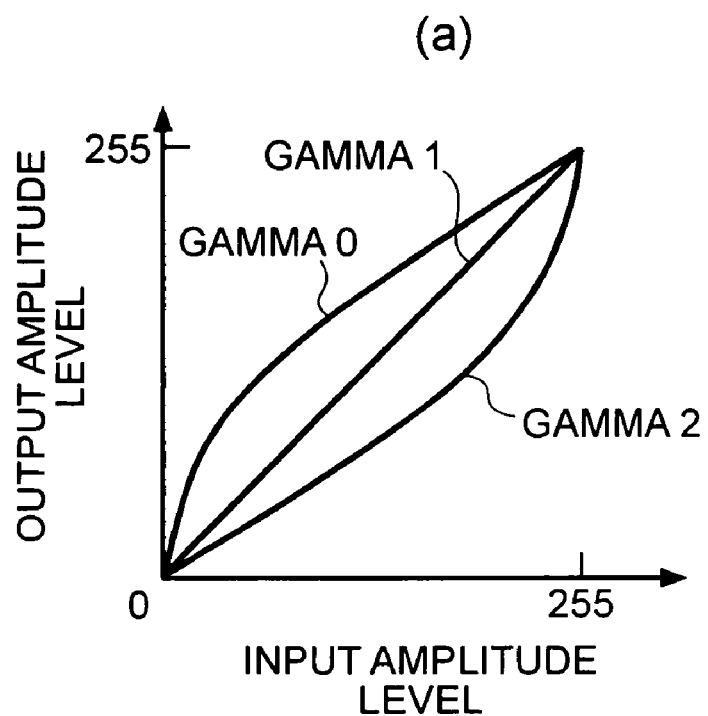
(b)
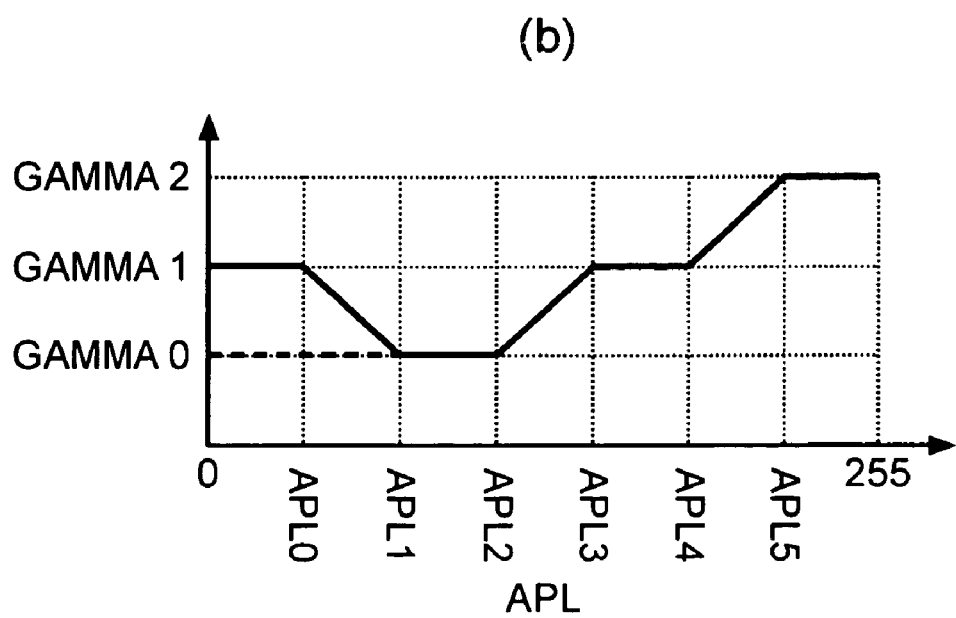

VIDEO SIGNAL PROCESSING CIRCUIT, VIDEO DISPLAY APPARATUS, AND VIDEO DISPLAY METHOD

CROSS-REFERENCES TO RELATED APPLICATIONS

This application relates to and claims priority from Japanese Patent Application No. 2003-114527, filed on Apr. 18, 2003, the entire disclosure of which is incorporated herein by reference.

BACKGROUND OF THE INVENTION

The present invention relates to a technique for displaying a video on the basis of a television signal or a video signal inputted from a personal computer or the like.

As a conventional art related to the present invention, there is one described in JP-A-8-317250 (Patent Literature 1). In the laid-open patent application, there is described a technique for calculating an APL and a histogram from an inputted video signal to analyze them, expanding ranges of a minimum level and a maximum level of the video signal to increase a gamma value of input/output characteristics corresponding to the vicinity of the APL, and increasing a contrast ratio of a displayed picture.

In a video display apparatus using a fixed pixel device such as a PDP or a liquid crystal panel, a higher contrast ratio corresponding to brightness of a screen is desired. However, in the above-mentioned conventional art, there is a defect in this respect because, for example, gain control of a video signal is not associated with a luminance level. In addition, calculation and analysis processing of a histogram are also required, which complicates the constitution and signal processing.

BRIEF SUMMARY OF THE INVENTION

Embodiments of the present invention provide a stable video with a high contrast corresponding to a brightness of a screen as a video signal processing technique in a video display apparatus.

In accordance with an aspect of the present invention, a video signal processing system for a video display apparatus which performs display on the basis of a video signal comprises a gain control module configured to provide a feedback signal based upon maximum luminance level information and average luminance level information of a luminance signal corresponding to the video signal, the feedback signal being used to control a gain of the luminance signal; and a correction module configured to apply a gamma correction based upon the average luminance level information to the video signal after the gain of the luminance signal has been controlled by the gain control module.

In specific embodiments, if the average luminance level falls within a low luminance area equal to or below a preset low average luminance level, the correction module is configured to perform the gamma correction based on a low luminance gamma curve in which a ratio of an input amplitude of the luminance signal before the gamma correction and an output amplitude of the luminance signal after the gamma correction is smaller than one. If the average luminance level falls within a medium luminance area above the preset low average luminance level and below a preset high average luminance level, the correction module is configured to not perform the gamma correction. If the average luminance level falls within a high luminance area equal to or above the preset high average luminance level, the correction module is configured to perform the gamma correction based on a high luminance gamma curve in which a ratio of an input amplitude of the luminance signal before the gamma correction and an output amplitude of the luminance signal after the gamma correction is greater than one.

In accordance with another aspect of the present invention, a video display method of performing display on the basis of a video signal comprises detecting a maximum luminance level and an average luminance level in a predetermined period of a luminance signal corresponding to the video signal; controlling a gain of the luminance signal according to a feedback signal generated based upon the detected maximum luminance level and average luminance level; applying a gamma correction based on the average luminance level to the video signal after the luminance signal gain is controlled; and performing video display based on the video signal after being subjected to the gamma correction.

In accordance with another aspect of the invention, a video display method of performing display on the basis of a video signal comprises receiving a plurality of input video signals. Each input video signal includes a corresponding luminance signal having a maximum luminance level and an average luminance level in a predetermined period. The luminance signals corresponding to the input video signals have different maximum luminance levels. The method further comprises, for each input video signal, controlling a gain of the luminance signal and applying a gamma correction to each input video signal after the luminance signal gain is controlled to produce an output for each of the input video signals after the gamma correction, such that the maximum amplitude of the output of each of the input video signals has the same preset value.

BRIEF DESCRIPTION OF THE DRAWINGS

FIG. 3 is an explanatory diagram of a relation between gamma curves and an average luminance level in the present invention.

DETAILED DESCRIPTION OF THE INVENTION

Embodiments of the present invention will be hereinafter described using the drawings.

FIGS. 1 to 5 are explanatory diagrams of a first embodiment of the present invention. This first embodiment is an example in the case in which, on the basis of luminance area information of a maximum luminance level and an average luminance level of a digital luminance signal after A/D conversion, gain control is applied to an analog luminance signal before A/D conversion, and gamma correction of a digital luminance signal is also performed in a later stage of a color matrix circuit.

Figure 1:
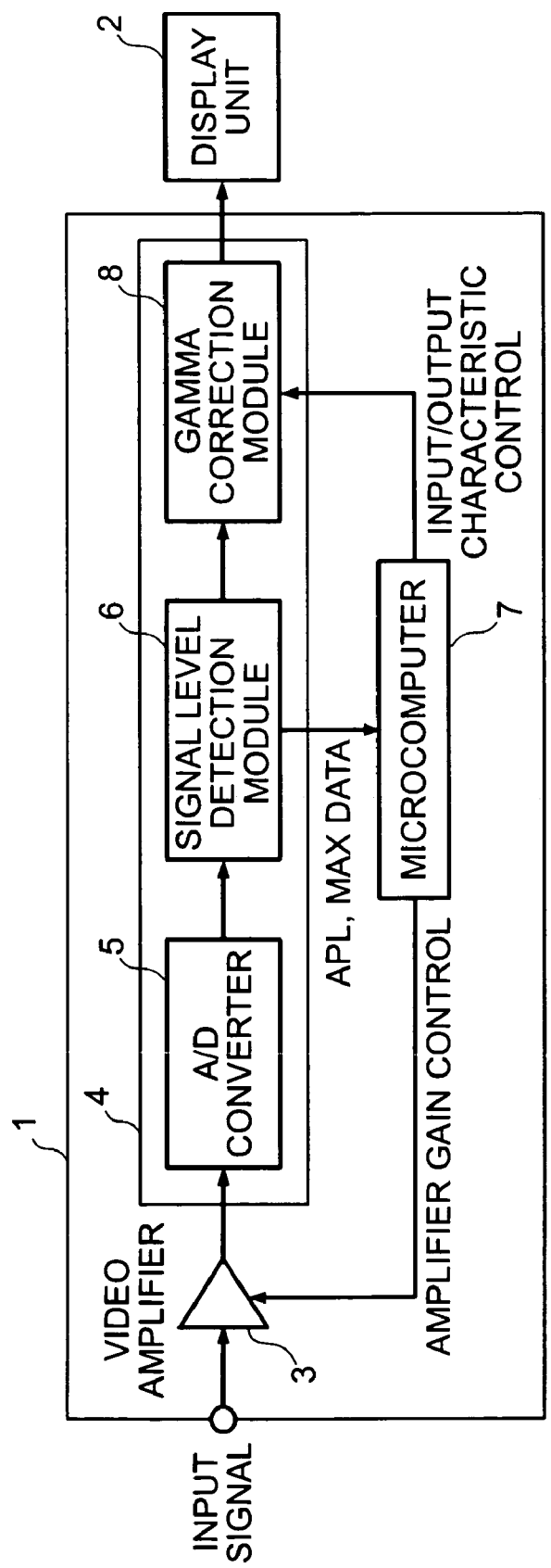
FIG. 1 is a basic diagram of a video display apparatus according to a first embodiment of the present invention.

In FIG. 1, reference numeral 1 denotes a video signal processing circuit; 2, a display unit which displays a video in color according to an output signal of the video signal processing circuit 1; 3, a video amplifier which amplifies an inputted analog luminance signal; 4, a digital signal formation processing circuit for forming a digital signal, detecting a luminance level, and performing a gamma correction; 5, an A/D converter which converts an analog signal into a digital signal; 6, a signal level detection module which detects a maximum luminance level and an average luminance level of a digital luminance signal in a predetermined period; 8, a gamma correction module which applies gamma correction to a digital video signal; and 7, a microcomputer which judges a corresponding luminance area for each of the detected maximum luminance level and average luminance level, forms and outputs a control signal corresponding to a result of the judgment, performs gain control in the video amplifier 3, and controls input/output characteristics of the digital video signal in the gamma correction module 8 in accordance with a gamma curve. An inputted analog luminance signal is amplified by the video amplifier 3, and then, converted into a digital luminance signal by the A/D converter 5 to be inputted to the signal level detection module 6. In the signal level detection module 6, a maximum luminance level and an average luminance level of the digital luminance signal in a video period of, for example, one field or one frame are detected. Information (signal) of the detected maximum luminance level and average luminance level is inputted to the microcomputer 7. In the microcomputer 7, a first luminance area, to which the maximum luminance level corresponds, and a second luminance area, to which the average luminance level corresponds, are judged on the basis of the inputted information of the maximum luminance level and average luminance level, respectively, and a control signal based upon a result of the judgment is formed and outputted. The control signal is inputted to the video amplifier 3 and the gamma correction module 8. In the video amplifier 3, an amplification gain of an analog luminance signal is controlled according to the control signal which is fed back. Since the amplification gain of the analog luminance is controlled, a gain of the digital luminance signal after A/D conversion also changes. In addition, in the gamma correction module 8, input/output characteristics of the digital video signal subjected to gain control are controlled according to the control signal. As a result, a video subjected to contrast adjustment according to brightness is displayed on the display unit 2.

Figure 2:
FIG. 2 is an explanatory diagram of gain control and gamma correction of a luminance signal in the present invention.

FIG. 2 is an explanatory diagram of a gain control operation and a gamma correction (input/output characteristic correction) operation of a luminance signal in the video display apparatus of FIG. 1. In the description of FIG. 2 below, the reference numerals for the components in FIG. 1 will be used.

In the video amplifier 3, for example, an analog luminance signal of an input signal having input/output characteristics A (in the case of the first embodiment, analog luminance signal) is subjected to gain control according to a control signal from the microcomputer 7, and outputted as, for example, an analog luminance signal of input/output characteristics B. The analog luminance signal of input/output characteristics B is further subjected to A/D conversion and combined with a color signal to be a digital video signal. The digital video signal is corrected in input/output characteristics of a luminance signal thereof by the gamma correction module 8, and outputted as, for example, a digital video signal of input/output characteristics C. The control signal inputted to the video amplifier 3 is formed on the basis of both information of the first luminance area, to which a maximum luminance level of the luminance signal corresponds, and information of a second luminance area, to which an average luminance level corresponds, or the information of the second luminance area. In addition, the control signal inputted to the gamma correction module 8 is formed on the basis of the information of the second luminance area to which the average luminance level of the luminance signal corresponds. Although the same reference for luminance area is used for the second luminance areas used for the gain control and the gamma correction here, it is also possible to adopt, for the luminance area used for the gamma correction, area information different from the reference of the luminance area used for the gain control.

FIG. 3 is an explanatory diagram of a relation between gamma curves for gamma correction and an average luminance level (APL). FIG. 3(a) shows gamma curves, and FIG. 3(b) shows switching points of the gamma curves with respect to the average luminance level (APL).

In FIG. 3(a), "gamma 1" is a linear gamma curve on which a level of input/output characteristics (level of an output with respect to an input) does not increase or decrease in a specific area, "gamma 0" is a gamma curve on which a level of input/output characteristics is higher than that of the "gamma 1" in any area and the level of input/output characteristics increases particularly in a low luminance area, and "gamma 2" is a gamma curve on which a level of input/output characteristics is lower than that of the "gamma 1" in any area and the level of input/output characteristics increases in a high luminance area. The "gamma 0", the "gamma 1", and the "gamma 2" are switched according to three average luminance levels APL0, APL1, and APL2.

In FIG. 3(b), APL0 to APL5 are average luminance levels, and a gamma curve is automatically switched to a gamma curve set in advance in each of APL0 to APL5. When the average luminance level (APL) is equal to or lower than APL0, the "gamma 1" is selected as the gamma curve. In a range in which the average luminance level is APL1 to APL2, the "gamma 0" is selected. The "gamma 1" is selected in a range of APL3 to APL4, and the "gamma 2" is selected in a range of APL 5 or higher average luminance level. Between APL0 and APL1, a gamma curve of characteristics between the "gamma 1" and the "gamma 0" is found by an arithmetic operation in the microcomputer 7 (FIG. 1), and between APL2 and APL3, a gamma curve of characteristics between the "gamma 0" and the "gamma 1" is found by an arithmetic operation in the same manner. In addition, between APL4 and APL5, a gamma curve of characteristics between the "gamma 1" and the "gamma 2" is found by an arithmetic operation. Note that the selection and arithmetic operation of a gamma curve corresponding to the average luminance level (APL) are not limited to the selection and the arithmetic operation as described above. For example, the "gamma 0" may be selected in the case in which the average luminance level is APL1 or lower, as indicated by a dotted line in the figure, according to characteristics or the like of a display unit.

Figure 4:
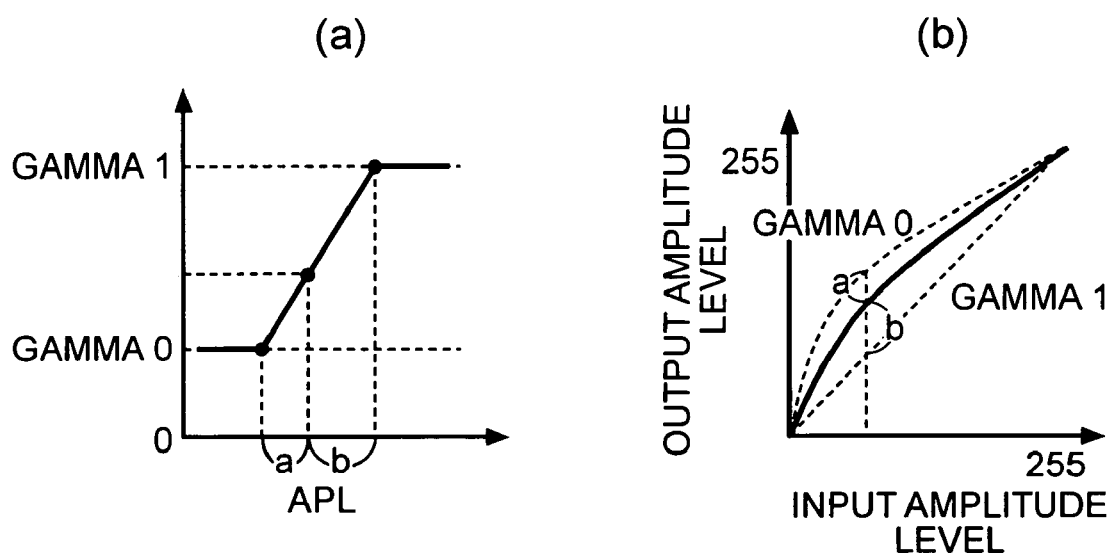
FIG. 4 is an explanatory diagram of gamma curves which are calculated in the present invention.

FIG. 4 is an explanatory diagram of gamma curves which are calculated in association with the average luminance level (APL). In FIG. 4, for example, in the case in which the average luminance level (APL) is in a level position of a:b between APL2 to APL3 in FIG. 3, a gamma curve with an output amplitude level position of a:b between the "gamma 0" and the "gamma 1" is found by an arithmetic operation.

Consequently, gamma correction proportional to the average luminance level (APL) is performed between APL2 and APL3. The correction technique is the same between APL4 and APL5 and between APL0 and APL1 of FIG. 3.

Figure 5:
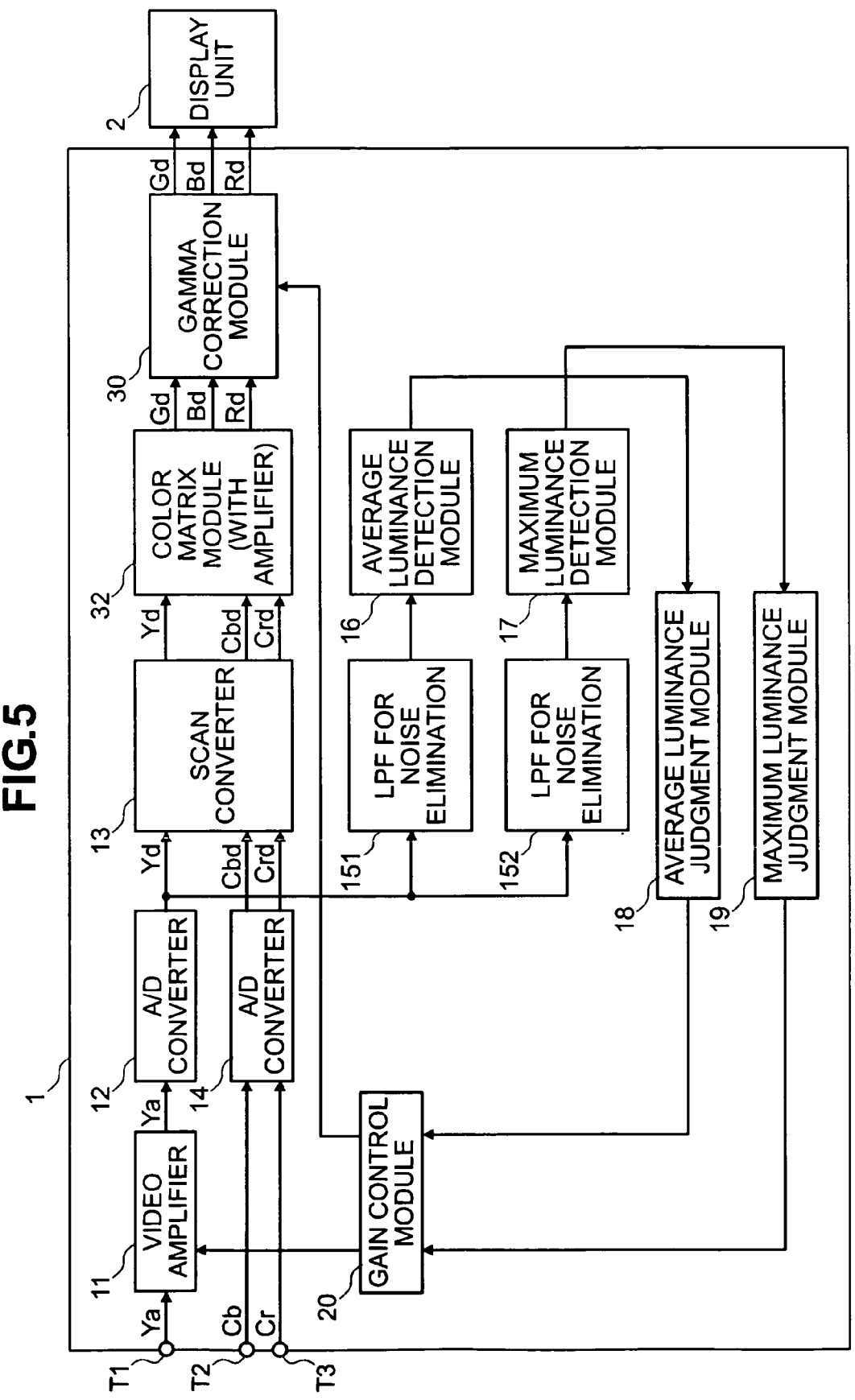
FIG. 5 is a block diagram of the video display apparatus according to the first embodiment of the present invention.

FIG. 5 is a block diagram of a video display apparatus as a first embodiment. In FIG. 5, reference numeral 1 denotes a video signal processing circuit; 2, a display unit constituted by using a PDP, a liquid crystal panel, or the like which performs video display; 11, a video amplifier which amplifies an inputted analog luminance signal Ya; 12, an A/D converter which converts the amplified analog luminance signal Ya into a digital luminance signal Yd; 13, a scan converter which converts an input signal into signal timing which a display apparatus can display; 14, an A/D converter which converts inputted analog color (color difference) signals Cb, Cr into digital color (color difference) signals Cbd, Crd; 151, 152 are LPFs for noise elimination serving as low-pass filters which performs noise elimination of the digital luminance signal Yd obtained by the A/D conversion; 16, an average luminance detection module which detects an average luminance level (APL) in a predetermined period, for example, one frame or one field, of an output signal (digital luminance signal) of the LPF for noise elimination 151; 17, a maximum luminance detection module which detects a maximum luminance level in a predetermined period, for example, one frame or one field, of an output signal (digital luminance signal) of the LPF for noise elimination 152; 18, an average luminance judgment module which receives input of information (signal) of the average luminance level detected by the average luminance detection module 16, and judges a luminance area to which the average luminance level corresponds; 19, a maximum luminance judgment module which receives input of information (signal) of the maximum luminance detection module 17, and judges a luminance area to which the maximum luminance level corresponds; 30, a gamma correction module; 20, a gain control module for forming a control signal, which controls an amplification gain in the video amplifier 11 and a gamma curve in the gamma correction module 30, on the basis of information of the luminance area, to which the average luminance level corresponds, and the luminance area, to which the maximum luminance level corresponds; and 32, a color matrix module which converts the digital luminance signal Yd and digital color (color difference) signals Cbd, Crd into digital video signals Rd, Gd, and Bd of red (R), green (G), and blue (B). Reference sign T1 denotes an input terminal of the analog luminance signal Ya, and T2, T3 denote input terminals of the analog color (color difference) signals Cb, Cr. Among the above-mentioned components, the average luminance judgment module 18, the maximum luminance judgment module 19, and the gain control module 20 are constituted by, for example, a microcomputer, and the A/D converters 12, 14, the scan converter 13, the LPFs for noise elimination 151, 152, the average luminance detection module 16, the maximum luminance detection module 17, the gamma correction module 30, and the color matrix module 32 are constituted by, for example, an LSI (large scale integration).

In the constitution of FIG. 5, the analog luminance signal Ya from the input terminal T1 is amplified by the video amplifier 11, and then, converted into the digital luminance signal Yd by the A/D converter 12. The digital luminance signal Yd is inputted to the scan converter 13 and is also inputted to the LPFs for noise elimination 151, 152. After noise is eliminated in the LPFs for noise elimination 151, 152, the digital luminance signal Yd is inputted to the average luminance detection module 16 and the maximum luminance detection module 17. An average luminance level in a predetermined period is detected by the average luminance detection module 16, and a maximum luminance level is detected by the maximum luminance detection module 17. Information of the detected average luminance level and maximum luminance lever is inputted to the average luminance judgment module 18 and the maximum luminance judgment module 19, respectively. The average luminance judgment module 18 judges to which luminance area the detected average luminance level corresponds, and the maximum luminance judgment module 19 judges to which luminance area the detected maximum luminance level corresponds. Information of the judged luminance area, to which the average luminance level corresponds, and information of the luminance area, to which the maximum luminance level corresponds, are inputted to the gain control module 20. In addition, the average luminance level used for the judgment of the luminance areas is also inputted from the average luminance judgment module 18. In the gain control module 20, first and second control signals are formed on the basis of the luminance area information and the average luminance level information. The first control signal is a signal which is fed back to the video amplifier 11 and used for controlling a gain of the video amplifier 11, and is formed, for example, on the basis of information of a combination of the luminance area, to which the detected average luminance level corresponds, and the luminance area, to which the detected maximum luminance level corresponds. The second control signal is a signal which is inputted to the gamma correction module 30 and used for causing the gamma correction module 30 to perform gamma correction processing, and is formed on the basis of the detected average luminance level. On the other hand, the respective analog color (color difference) signals Cb, Cr inputted from the input terminals T2, T3 are converted into digital (color difference) signals Cbd, Crd by the A/D converter 14, and then, inputted to the scan converter 13 in the same manner as the digital luminance signal Yd and subjected to pixel conversion. The digital luminance signal Yd outputted from the scan converter 13 is inputted to the color matrix module 32. The digital (color difference) signals Cbd, Crd outputted from the scan converter 13 are also inputted to the color matrix module 32. In the color matrix module 32, the digital luminance signal Yd and the digital color (color difference) signals Cbd, Crd are converted into the digital video signals Rd, Gd, and Bd of red (R), green (G), and blue (B) and outputted. The outputted digital video signals Rd, Gd, and Bd are inputted to the display unit 2 and displayed as a video by the display unit 2.

According to the first embodiment, in the video display apparatus, because of the constitution for performing gain control of a video signal in a pre-stage of gamma correction, an amplitude of an input video signal inputted to the gamma correction module 30 can be set to substantially a fixed value and, as a result, gamma correction can be performed with high accuracy. In addition, because of the constitution for detecting a maximum luminance (maximum amplitude) level of an input video signal to perform gain control and subsequently performing gamma correction based upon average luminance level (APL) information, gamma correction can be performed in a state in which a maximum amplitude of a video signal is substantially matched with a dynamic range, and contrast adjustment in a wide level becomes possible. Moreover, since a gamma curve is switched or calculated in association with an average luminance level in the gamma correction, a stable video with a high contrast can be obtained according to brightness of a screen. In contrast, in a system that does not employ feedback control to perform gain control based on the detected maximum amplitude of the video signal, gamma correction will generally not be performed in a state in which a maximum amplitude of a video signal is substantially matched with a dynamic range. Consequently, the correction in such a system generally does not produce a video output that is as stable or has as high a contrast as the video output generated by the present embodiment employing feedback gain control.

Figure 6:
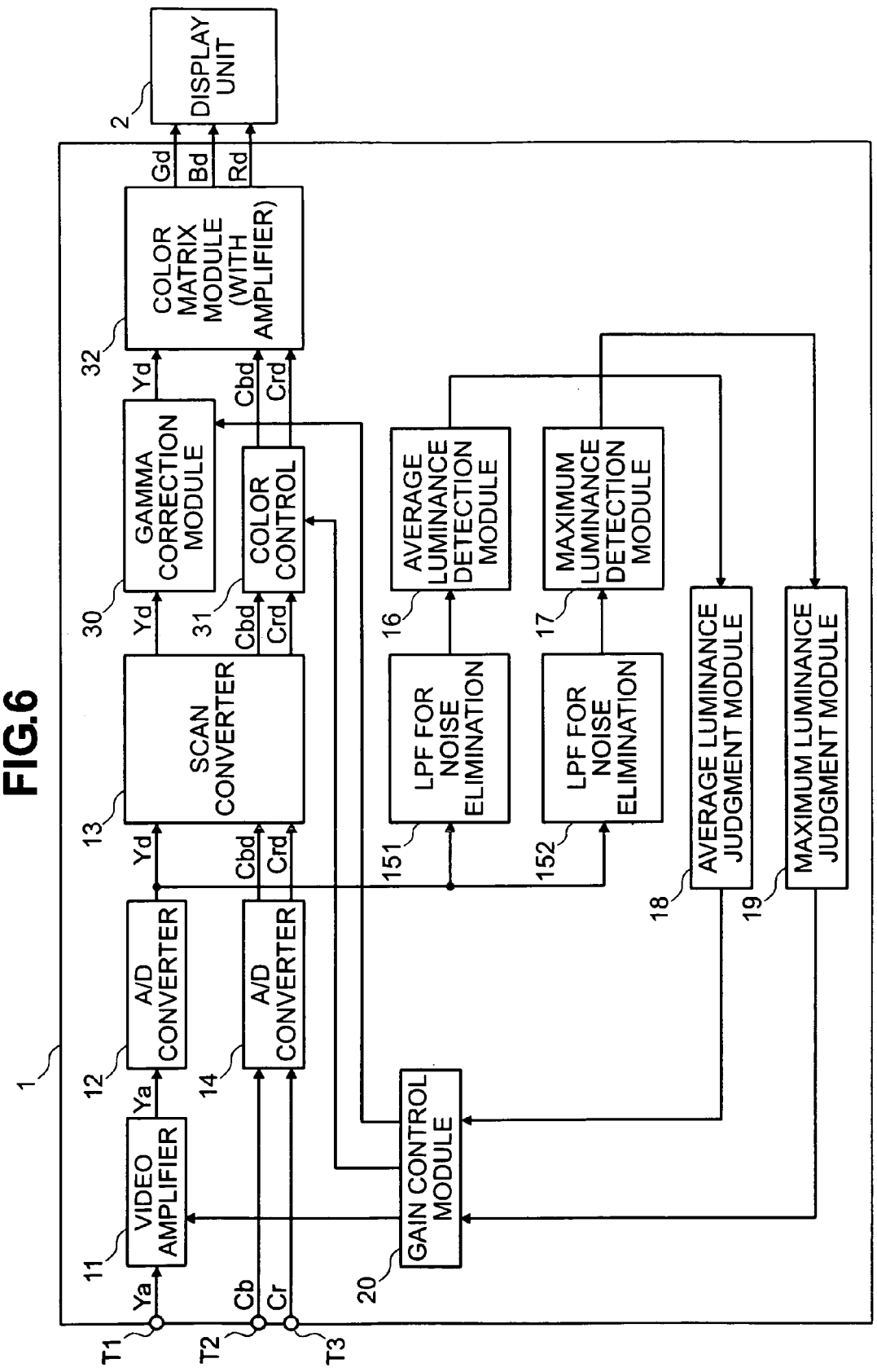
FIG. 6 is a block diagram of a video display apparatus according to a second embodiment of the present invention.
Figure 7:
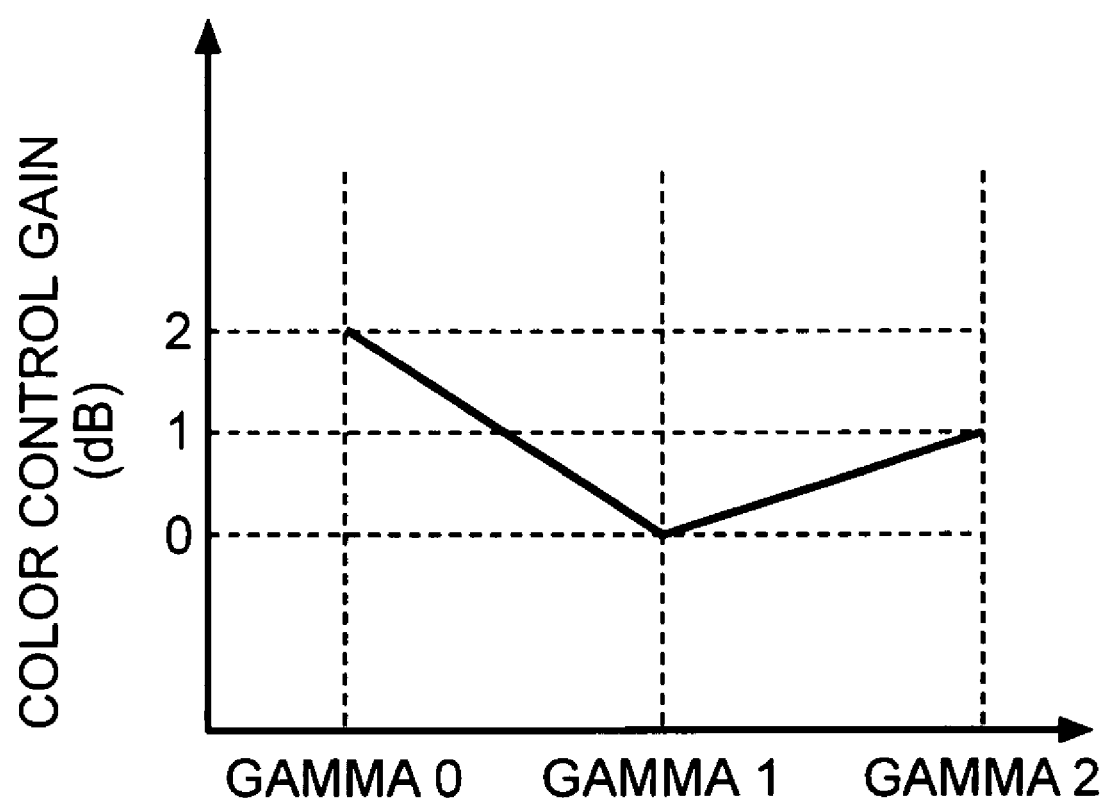
FIG. 7 is an explanatory diagram of color correction in the video display apparatus of FIG. 6.

FIG. 6 and FIG. 7 are explanatory diagrams of a second embodiment of the present invention. FIG. 6 is a block diagram of a video display apparatus as the second embodiment of the present invention, and FIG. 7 is an explanatory diagram of color density correction (color correction=color control) in the video display apparatus of FIG. 6.

In this second embodiment, a gamma correction module and a color control module for color correction are provided on a later stage side of a scan converter and on a pre-stage side of a color matrix module, and correction for increasing color density (color correction) of a video in association with increase in gain of a video signal is performed in conjunction with gamma correction. Constitutions and functions of the other components are substantially the same as those in the case of the first embodiment.

In FIG. 6, reference numeral 31 denotes a color control module which corrects color density of a digital video signal. Components that are the same as those in FIG. 5 (first embodiment) are denoted by the same reference numerals as in FIG. 5, and a description is omitted for components having the same actions. Information of a luminance area, to which an average luminance level from the average luminance judgment module 18 corresponds, and information of a luminance area, to which a maximum luminance level from the maximum luminance judgment module 19 corresponds, are fed back to the gain control module 20. The gain control module 20 forms a control signal for controlling an amplification gain in the video amplifier 11, a gamma curve in the gamma correction module 30, and a color control gain in the color control module 31. Among the components of FIG. 6, the average luminance judgment module 18, the maximum luminance judgment module 19, and the gain control module 20 are constituted by, for example, a microcomputer, and the A/D converters 12, 14, the scan converter 13, the LPFs for noise elimination 151, 152, the average luminance detection module 16, the maximum luminance detection module 17, the gamma correction module 30, the color control module 31, and the color matrix module 32 are constituted by, for example, an LSI (large scale integration).

In the constitution of FIG. 6, as in the case of FIG. 5, an average luminance level and a maximum luminance level in a predetermined period are detected from the A/D converted digital luminance signal Yd, information of luminance areas corresponding to information of the detected average luminance level and maximum luminance level, respectively, is formed and fed back to be inputted to the gain control module 20. In the gain control module 20, first, second, and third control signals are formed on the basis of the luminance area information and the average luminance level. The first control signal is a signal which is used for controlling a gain of the video amplifier 11 to adjust a contrast and is, for example, a control signal which is formed on the basis of information of a combination of the luminance area, to which the detected average luminance level corresponds, and the luminance area, to which the detected maximum luminance level corresponds. The second control signal is a signal which is inputted to the gamma correction module 30 and used for causing the gamma correction module 30 to perform gamma correction processing, and is a control signal which is formed on the basis of the detected average luminance level. The third control signal is a signal which is inputted to the color control module 31 and used for performing color correction of a digital color (color difference) signal. The digital luminance signal Yd outputted from the scan converter 13 is inputted to the gamma correction module 30 and controlled according to the second control signal subjected to gamma correction in the gamma correction module 30. The digital luminance signal Yd subjected to the gamma correction is inputted to the color matrix module 32. Digital (color difference) signals Cbd, Crd outputted from the scan converter 13 are inputted to the color control module 31, controlled according to the third control signal in the color control module 31 and subjected to color correction. The digital (color difference) signals Cbd, Crd subjected to color correction are inputted to the color matrix module 32. In the color matrix module 32, the digital luminance signal Yd and the digital color (color difference) signals Cbd, Crd are converted into the digital video signals Rd, Gd, and Bd of red (R), green (G), and blue (B) and outputted. The outputted digital video signals Rd, Gd, and Bd are inputted to the display unit 2 and displayed as a video on the display unit 2. Gamma correction of the digital luminance signal Yd in the gamma correction module 30 according to the second control signal and the color correction of the digital color (color difference) signals Cbd, Crd in the color control module 31 according to the third control signal are performed in association with each other.

FIG. 7 is an explanatory diagram of color correction (color control) in the color control module 31 (FIG. 6). In the following description of FIG. 7, the reference symbols for the components in FIG. 6 will be used.

In FIG. 7, a color control gain of the digital color (color difference) signals Cbd, Crd in the color control module 31 is controlled in association with a change of a gamma curve in the gamma correction module 30 to be 0 dB in the case in which the gamma curve is "gamma 1," 1 dB in the case in which the gamma curve is "gamma 2," and 2 dB in the case in which the gamma curve is "gamma 0." That is, the color control gain is controlled such that, when an average luminance level is low, the gamma curve is set to the "gamma 0" to increase a luminance difference in a low luminance area to increase a contrast and also increase color density and, to the contrary, when the average luminance level is high, the gamma curve is set to the "gamma 2" to increase a luminance difference in a high luminance area to increase a contrast and decrease color density compared with the case of the "gamma 0." The color control gain is lower for the high luminance area than for the low luminance area. In some cases, the color control gain is not performed for the high luminance area since the effect may not be significant. Note that, in the case in which the gamma curve is set as characteristics among the "gamma 0," the "gamma 1," and the "gamma 2" by arithmetic operation, the color control gain is set to a value corresponding to the gamma curve.

According to the second embodiment, since it is also possible to set an amplitude of an input video signal, which is inputted to the gamma correction module 30, to substantially a fixed value in the video display apparatus, gamma correction can be performed with high accuracy. In addition, a video in which color density is also secured can be displayed by control of the color control module 31. Further, since gamma correction can be performed in a state in which a maximum amplitude of a video signal is substantially matched with a dynamic range, contrast adjustment in a wide level becomes possible. Moreover, a stable video with a high contrast can be obtained by gamma correction according to brightness of a screen.

Note that, in the above-mentioned embodiments, concerning gain control of a luminance signal, gain control is performed for an analog luminance signal before A/D conversion. However, the present invention is not limited to this, and the gain control may be performed for a digital luminance signal after A/D conversion or may be performed for both of an analog luminance signal before A/D conversion and a digital luminance signal after A/D conversion. In addition, concerning the color correction, in the above-mentioned embodiments, a gain of a digital color (color difference) signal after A/D conversion is controlled to perform the color correct. However, the present invention is not limited to this, and the color correction may be performed by controlling a gain for an analog color (color difference) signal before A/D conversion. The color correction may be performed by controlling a gain for both the analog color (color difference) signal before A/D conversion and the digital color (color difference) signal after A/D conversion. Further, noise elimination mechanisms such as an LPF for noise elimination may not be provided. Moreover, a digital luminance signal used for detection of a maximum luminance level and an average luminance level is not limited to one immediately after A/D conversion. In addition, in the case in which an inputted signal is a digital video signal, the A/D converter described in the above-mentioned embodiments is unnecessary.

According to the present invention, a stable video with a high contrast can be obtained according to brightness of a screen. It is noted that the various modules in the playback device may be configured in hardware or in software which is stored in a computer readable medium to be executed by a processor such as the CPU in the system control module 104.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A video signal processing system for a video display apparatus which performs display on the basis of a video signal, the video signal processing system comprising:
    a gain control module configured to provide a feedback signal based upon maximum luminance level information and average luminance level information of a luminance signal corresponding to the video signal, the feedback signal being used to control a gain of the luminance signal;
    a correction module configured to apply a gamma correction based upon the average luminance level information to the video signal after the gain of the luminance signal has been controlled by the gain control module;
    wherein the correction module is configured to perform the gamma correction based on a gamma curve which is set in association with luminance area information to which the average luminance level correspond;
    wherein:
    if the average luminance level falls within a low luminance area equal to or below a preset low average luminance level, the correction module is configured to perform the gamma correction based on a low luminance gamma curve in which a ratio of an input amplitude of the luminance signal before the gamma correction and an output amplitude of the luminance signal after the gamma correction is larger than one;
    if the average luminance level falls within a medium luminance area above the preset low average luminance level and below a preset high average luminance level, the correction module is configured to not perform the gamma correction; and
    if the average luminance level falls within a high luminance area equal to or above the preset high average luminance level, the correction module is configured to perform the gamma correction based on a high luminance gamma curve in which a ratio of an input amplitude of the luminance signal before the gamma correction and an output amplitude of the luminance signal after the gamma correction is greater than one.

2. A video signal processing system for a video display apparatus which performs display on the basis of a video signal the video signal processing system comprising:
    a gain control module configured to provide a feedback signal based upon maximum luminance level information and average luminance level information of a luminance signal corresponding to the video signal, the feedback signal being used to control a gain of the luminance signal;
    a correction module configured to apply a gamma correction based upon the average luminance level information to the video signal after the gain of the luminance signal has been controlled by the gain control module;
    wherein the correction module is configured to perform the gamma correction based on a gamma curve which is set in association with luminance area information to which the average luminance level correspond;
    wherein:
    if the average luminance level falls within a low luminance area equal to or below a preset low average luminance level the correction module is configured to perform the gamma correction based on a low luminance gamma curve in which a ratio of an input amplitude of the luminance signal before the gamma correction and an output amplitude of the luminance signal after the gamma correction is smaller than one;
    if the average luminance level falls within a medium luminance area above the preset low average luminance level and below a preset high average luminance level, the correction module is configured to not perform the gamma correction;
    if the average luminance level falls within a high luminance area equal to or above the preset high average luminance level, the correction module is configured to perform the gamma correction based on a high luminance gamma curve in which a ratio of an input amplitude of the luminance signal before the gamma correction and an output amplitude of the luminance signal after the gamma correction is greater than one; and
    if the average luminance level falls below a preset minimum average luminance threshold level which is lower than the preset low average luminance level, the correction module is configured to not perform the gamma correction.

3. A video signal processing system for a video display apparatus which performs display on the basis of a video signal the video signal processing system comprising:
    a gain control module configured to provide a feedback signal based upon maximum luminance level information and average luminance level information of a luminance signal corresponding to the video signal, the feedback signal being used to control a gain of the luminance signal;

a correction module configured to apply a gamma correction based upon the average luminance level information to the video signal after the gain of the luminance signal has been controlled by the gain control module; and an A/D converter configured to convert an analog luminance signal of the video signal into an A/D converted digital luminance signal, and wherein the gain control module is configured to judge a first luminance area, to which a maximum luminance level in a predetermined period corresponds, and a second luminance area, to which an average luminance level in the predetermined period corresponds, of the A/D converted digital luminance signal, and control a gain of any one of or both of the analog luminance signal before A/D conversion and the A/D converted digital luminance signal after A/D conversion according to a feedback signal generated based on the first luminance area with the corresponding maximum luminance level and the second luminance area with the corresponding average luminance level to control the gain of the luminance signal.

4. A video signal processing system for a video display apparatus which performs display on the basis of a video signal, the video signal processing system comprising:

a gain control module configured to provide a feedback signal based upon maximum luminance level information and average luminance level information of a luminance signal corresponding to the video signal, the feedback signal being used to control a gain of the luminance signal;

a correction module configured to apply a gamma correction based upon the average luminance level information to the video signal after the gain of the luminance signal has been controlled by the gain control module;

wherein the correction module is configured to apply the gamma correction to the video signal which is a digital video signal comprising a digital color signal and a digital luminance signal;

wherein the correction module includes a color control module configured to perform color correction of the digital color signal based on the average luminance level information;

wherein:

if the average luminance level falls within a low luminance area equal to or below a preset low average luminance level, the color control module is configured to perform color correction by applying a first color control gain to the digital color signal; and if the average luminance level falls within a luminance area above the preset low average luminance level, the color control module is configured to not perform color correction.

5. A video signal processing system for a video display apparatus which performs display on the basis of a video signal, the video signal processing system comprising:

a gain control module configured to provide a feedback signal based upon maximum luminance level information and average luminance level information of a luminance signal corresponding to the video signal the feedback signal being used to control a gain of the luminance signal;

a correction module configured to apply a gamma correction based upon the average luminance level information to the video signal after the gain of the luminance signal has been controlled by the gain control module;

wherein the correction module is configured to apply the gamma correction to the video signal which is a digital video signal comprising a digital color signal and a digital luminance signal;

wherein the correction module includes a color control module configured to perform color correction of the digital color signal based on the average luminance level information;

wherein:

if the average luminance level falls within a low luminance area equal to or below a preset low average luminance level, the color control module is configured to perform color correction by applying a first color control gain to the digital color signal;

if the average luminance level falls within a medium luminance area above the preset low average luminance level and below a preset high average luminance level, the color control module is configured to not perform color correction; and if the average luminance level falls within a high luminance area equal to or above the preset high average luminance level, the color control module is configured to perform color correction by applying a second color control gain to the digital color signal, the second color control gain being smaller than the first color control gain.

6. A video display apparatus which performs display on the basis of a video signal including a luminance signal, comprising:

a signal processing circuit configured to provide a feedback signal based on maximum luminance level information and average luminance level information of the luminance signal to control a gain of the luminance signal, and to apply a gamma correction based upon the average luminance level information to the video signal after the gain of the luminance signal has been controlled;

a display unit configured to perform video display based on the video signal subjected to the gamma correction;

wherein if the average luminance level falls within a low luminance area equal to or below a preset low average luminance level, the signal processing circuit is configured to perform the gamma correction based on a low luminance gamma curve in which a ratio of an input amplitude of the luminance signal before the gamma correction and an output amplitude of the luminance signal after the gamma correction is larger than one;

if the average luminance level falls within a medium luminance area above the preset low average luminance level and below a preset high average luminance level, the signal processing circuit is configured to not perform the gamma correction; and if the average luminance level falls within a high luminance area equal to or above the preset high average luminance level, the signal processing circuit is configured to perform the gamma correction based on a high luminance gamma curve in which a ratio of an input amplitude of the luminance signal before the gamma correction and an output amplitude of the luminance signal after the gamma correction is greater than one.

7. A video display method of performing display on the basis of a video signal, comprising:

detecting a maximum luminance level and an average luminance level in a predetermined period of a luminance signal corresponding to the video signal;

controlling a gain of the luminance signal according to a feedback signal generated based upon the detected maximum luminance level and average luminance level;

applying a gamma correction based on the average luminance level to the video signal after the luminance signal gain is controlled;

performing video display based on the video signal after being subjected to the gamma correction;

wherein applying the gamma correction comprises:

if the average luminance level falls within a low luminance area equal to or below a preset low average luminance level, performing the gamma correction based on a low luminance gamma curve in which a ratio of an input amplitude of the luminance signal before the gamma correction and an output amplitude of the luminance signal after the gamma correction is larger than one;

if the average luminance level falls within a medium luminance area above the preset low average luminance level and below a preset high average luminance level, not performing the gamma correction; and if the average luminance level falls within a high luminance area equal to or above the preset high average luminance level, performing the gamma correction based on a high luminance gamma curve in which a ratio of an input amplitude of the luminance signal before the gamma correction and an output amplitude of the luminance signal after the gamma correction is greater than one.

* * * * *